(12) United States Patent
Gomes (10) Patent No.: US 6,878,425 B1
(45) Date of Patent: Apr. 12, 2005

(54) TINTED POLARIZED WINDOW FILM

(76) Inventor: Keola R Gomes, 31 Kuhinia St., Wailuku, HI (US) 96793

( * ) Notice: Subject to any disclaimer, the term of this patent is extended or adjusted under 35 U.S.C. 154(b) by 47 days.

(21) Appl. No.: 10/087,916

(22) Filed: Mar. 4, 2002

(51) Int. Cl.$^7$ .................................................. B32B 3/10
(52) U.S. Cl. .................... 428/40.1; 296/97.1; 296/97.2; 296/97.3; 428/40.4; 428/41.6; 428/41.7; 428/41.8; 428/42.1; 428/138; 428/200; 428/201
(58) Field of Search ............................... 428/40.1, 40.4, 428/41.6, 41.7, 41.8, 42.1, 138, 200, 201; 296/97.1, 97.2, 97.3

(56) References Cited

U.S. PATENT DOCUMENTS 6,361,838 B1 * 3/2002 Miyatake .................... 428/1.31
6,461,709 B1 * 3/2002 Janssen ...................... 428/41.7

* cited by examiner

Primary Examiner—Nasser Ahmad
(74) Attorney, Agent, or Firm—Michael I. Kroll (57) ABSTRACT

The present invention 10 discloses a polarized filter film having a plurality of light-filtering layers 20, 22, 24, each having a different polarization aperture and tint hue that can be selectively combined to form a polarized filter film having a combined opacity rating of 5% to 55% when applied to a transparent medium 18 such as a window. The combined polarized filter film 10 is comprised of a plurality of layers 20, 22, 24 of light-filtering material wherein each layer has a plurality of apertures 26, 28 positioned either vertically 36 or angularly 38 so that the horizontal rays associated with glare are reduced dramatically. Each layer of film has a plurality of slotted apertures 36, 38 that is biased or offset from the overlaying light-filtering film apertures whereby varying degrees of light-blocking properties can be achieved by using the light-filtering films in conjunction with additional layers. The present invention 10 is attached to the transparent medium 18 by using an adhesive 30 which has a removable protective backing layer 34.

8 Claims, 11 Drawing Sheets

TINTED POLARIZED WINDOW FILM

BACKGROUND OF THE INVENTION

1. Field of the Invention

The present invention relates generally to light-filtering materials and more specifically to a polarized film having a predetermined opacity rating of 5% to 55%. The polarizing film is comprised of a polarity of tinted film layers bonded adhesively whereby the combination of primary tinted film colors can be combined to vary the tint hue of the resultant film with varying degrees of filtering capability ranging from 5% to 55%.

The polarized film has an adhesive layer and a peelably removable protective layer. Once the polarized film has been applied to a transparent medium the adhesive layer will remain in a deteriorating curing state whereby the adhesive element will cure over a predetermined period of time, such as 72 hours becoming permanently bonded to the window.

Each of the light-filtering layers forming the polarized film has a plurality of slotted apertures that are biased from the next engaging light-filtering film apertures whereby degrees of light blocking can be achieved by using a first polarized filter film in conjunction with a second polarized filter film and/or a third polarized filter film. The light-filtering films comprise polarizing light filters manufactured from suitable light absorbing or light blocking material having substantially vertical apertures therein whereby horizontal light rays usually associated with glare are significantly reduced.

The application of the polarizing light-filtering film is applicable to commercial or private use, such as the windows of a motor vehicle, home patio doors, homes, commercial buildings, buses, trains, planes, boats or ships.

2. Description of the Prior Art

There are numerous methods for blocking glare through transparent elements including the use of polarized lighting elements. While these glare blocking devices may be suitable for the purposes for which they where designed, they would not be as suitable for the purposes of the present invention as heretofore described.

It is thus desirable to provide a polarized filter film having a plurality of film layers each having a unique aperture orientation and tint hue whereby the combination of film layers will produce a polarized filter film having a predetermined opacity rating from 5% to 55% and a tint hue that can be varied by combining filter films of a varying colors to produce a predetermined tint hue.

SUMMARY OF THE PRESENT INVENTION

The present invention discloses a polarized filter film having a plurality of light-filtering layers each having a different polarization aperture and tint hue that can be selectively combined to form a polarized filter film having a combined opacity rating of 5% to 55% when applied to a transparent medium such as a window. The combined polarized filter film is comprised of a plurality of layers of light-filtering material wherein each layer has a plurality of apertures positioned either vertically or angularly so that the horizontal rays associated with glare are reduced dramatically. Each layer of film has a plurality of slotted apertures that is biased or offset from the overlaying light-filtering film apertures whereby varying degrees of light-blocking properties can be achieved by using the light-filtering films in conjunction with additional layers. The present invention is attached to the transparent medium by using an adhesive which has a removable protective backing layer.

A primary object of the present invention is to provide a polarized filter film of tinted polarized light-filtering layers.

Another object of the present invention is to provide a polarized filter film of tinted polarized light-filtering film layers that can be selectively applied to a window as a single film providing an opacity of 5% to 55%.

Yet another object of the present invention is to provide a polarized filter film of tinted polarized light-filtering material comprised of a plurality of filter films having different aperture alignment.

Still yet another object of the present invention is to provide colored polarized filtering film comprised of a plurality of film layers having different aperture alignment that when used in conjunction with other filter films will vary the amount of filtered light passing through the polarized filtering film.

Another object of the present invention is to provide colored polarized filtering film comprised of a polarity of film layers forming a polarized filtering film with an opacity rating of 5% to 55% whereby a user can select the degree of light filtering to apply to a window.

Yet another object of the present invention is to provide colored polarized filtering film comprised of a plurality of filter films bonded adhesively forming a single polarized filtering film having an opacity of 5% to 55% and a variety of tinted hues determined by the combination of primary colors.

Still yet another object of the present invention is to provide colored polarized filtering film having an adhesive layer on one face of the light-filtering material.

Another object of the present invention is to provide colored polarized filtering film having an adhesive layer on one face of the light-filtering material with a peelable protective layer thereon.

Yet another object of the present invention is to provide polarized filtering elements that is comprised of one or more tinted polarized filtering films.

Still yet another object of the present invention is to provide a polarizing filter film having an adhesive layer that when applied to a transparent medium will cure to a fill adhesive state in approximately 72 hours.

Additional objects of the present invention will appear as the description proceeds.

The present invention overcomes the shortcomings of the prior art by providing a polarized filtering film comprised of polarizing filter film layers adhesively bonded producing a composite film layer that can be applied to any transparent medium.

In addition the polarized filtering film can have an opacity rating of 5% to 55% with an adhesive layer having a peelable protective layer removably attached thereto. Once the polarized filter film has been applied to a transparent medium the adhesive will begin a curing period whereby the filtering film can be removed from the transparent medium prior to expiration of the curing period which is approximately 72 hours.

Furthermore the polarized light-filtering material can be manufactured in a variety of colors.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

With regard to reference numerals used, the following numbering is used throughout the drawings.

10 present invention
12 vehicle
14 windshield
16 side window
18 transparent medium
20 first polarization layer
22 second polarization layer
24 third polarization layer
26 patio door window
28 frame
30 adhesive
32 polarizing film
34 backing
36 vertical apertures
38 angular apertures
40 first layer
42 second layer
44 combined layer.

DETAILED DESCRIPTION OF THE PREFERRED EMBODIMENT

The following discussion describes in detail one embodiment of the invention and several variations of that embodiment. This discussion should not be construed, however, as limiting the invention to those particular embodiments. Practitioners skilled in the art will recognize numerous other embodiments as well. For a definition of the complete scope of the invention, the reader is directed to the appended claims.

Figure 1:
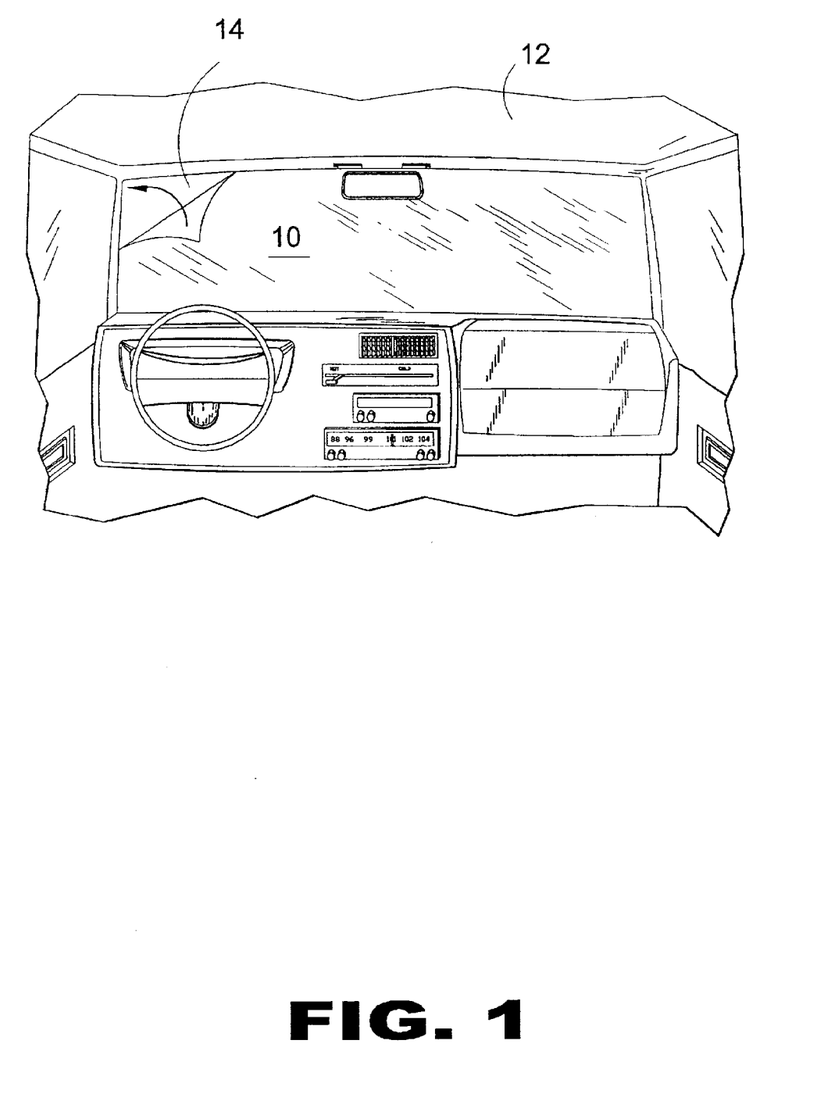
FIG. 1 is a perspective view of one use of the present invention installed on a motor vehicle.

Turning to FIG. 1, shown therein is a perspective view of one use of the present invention 10 installed on a motor vehicle 12 windshield 14. The thin tinted transparent film substantially filters horizontal light rays such as glare that are reflections off of other surfaces. The present invention 10 has a number of polarizing film layers having different angular apertures whereby the light-filtering application can vary depending upon the number of layers used to form the polarizing filter film. The film is applicable to commercial or private use, such as a motor vehicle front windshield, side window, home patio doors, homes, commercial buildings, buses, trains, planes, boats or ships.

Figure 2:
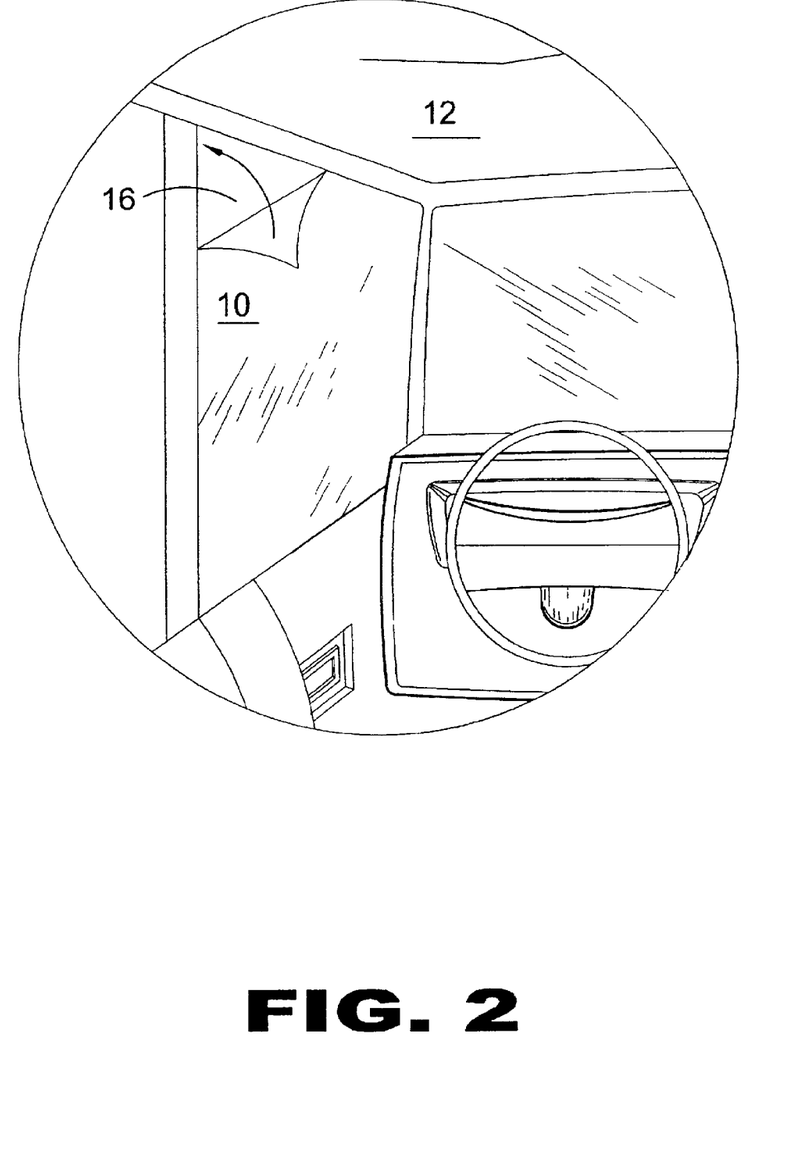
FIG. 2 is a perspective view of one use of the present invention installed on a motor vehicle.

Turning to FIG. 2, shown therein is a perspective view of one use of the present invention 10 installed on a motor vehicle 12 side window 16. The polarized film can have varying degrees of filtering ranging by incremental amounts from 5% to 55%. Application of the polarizing film is comprised of placing the side of the polarizing film that has adhesive disposed thereon upon the surface of the window 16. The bonding material has the properties that removal of the polarized film can occur for a predetermined period of time which provides a chance for adjustment or removal of the polarized film.

Figure 3:
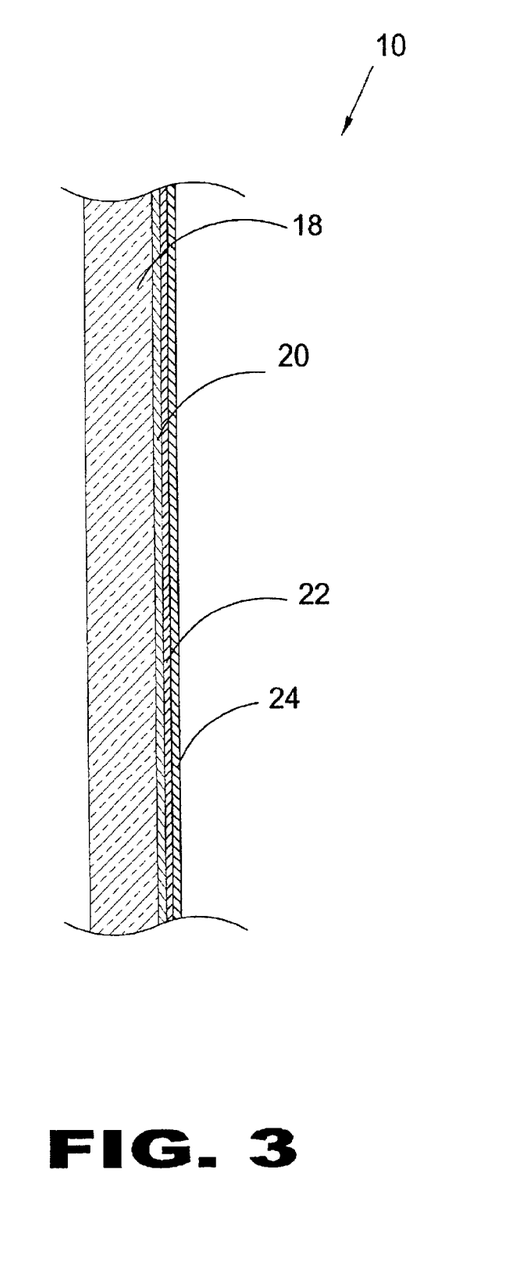
FIG. 3 is a cross section view of the present invention.

Turning to FIG. 3, shown therein is a cross section view of the present invention 10. Shown is the present invention with the polarized film having an adhesive layer thereon which has a curing expiration period of approximately 72 hours applied to a transparent medium 18. The polarized filter film is comprised of a plurality of filtering film layers 20, 22, 2, for example, being a first, second and third polarization layer, respectively, forming an opacity rating of 5% to 55% depending on the number of polarized filtering films used. A variety of tint hues can be created by varying the colors of the filtering films used to comprise the polarizing filter film of the present invention.

Figure 4:
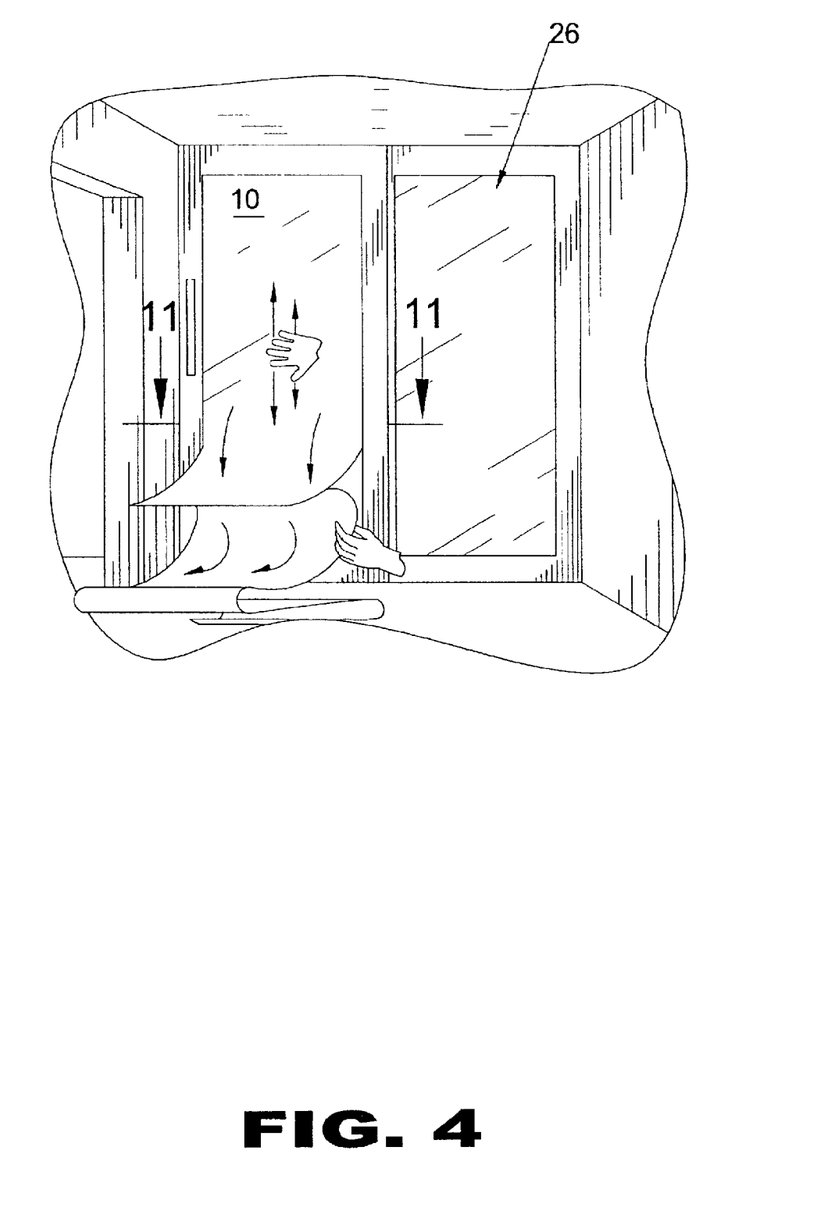
FIG. 4 is a perspective view of another application of the present invention installed on a patio door.

Turning to FIG. 4, shown therein is a perspective view of another application of the present invention 10 installed on a patio door window 26. The varying percentages and structural configurations of polarized layers comprising the film can be manufactured to form a user selectable tint of any hue ranging from 5% to 55% degree light admittance. During application, the protective layer is removed and the adhesive layer bonds the polarized film to the desired transparent medium. Once applied the adhesive layer forms a permanent bond with the transparent medium after a curing expiration time of approximately 72 hours.

Figure 5:
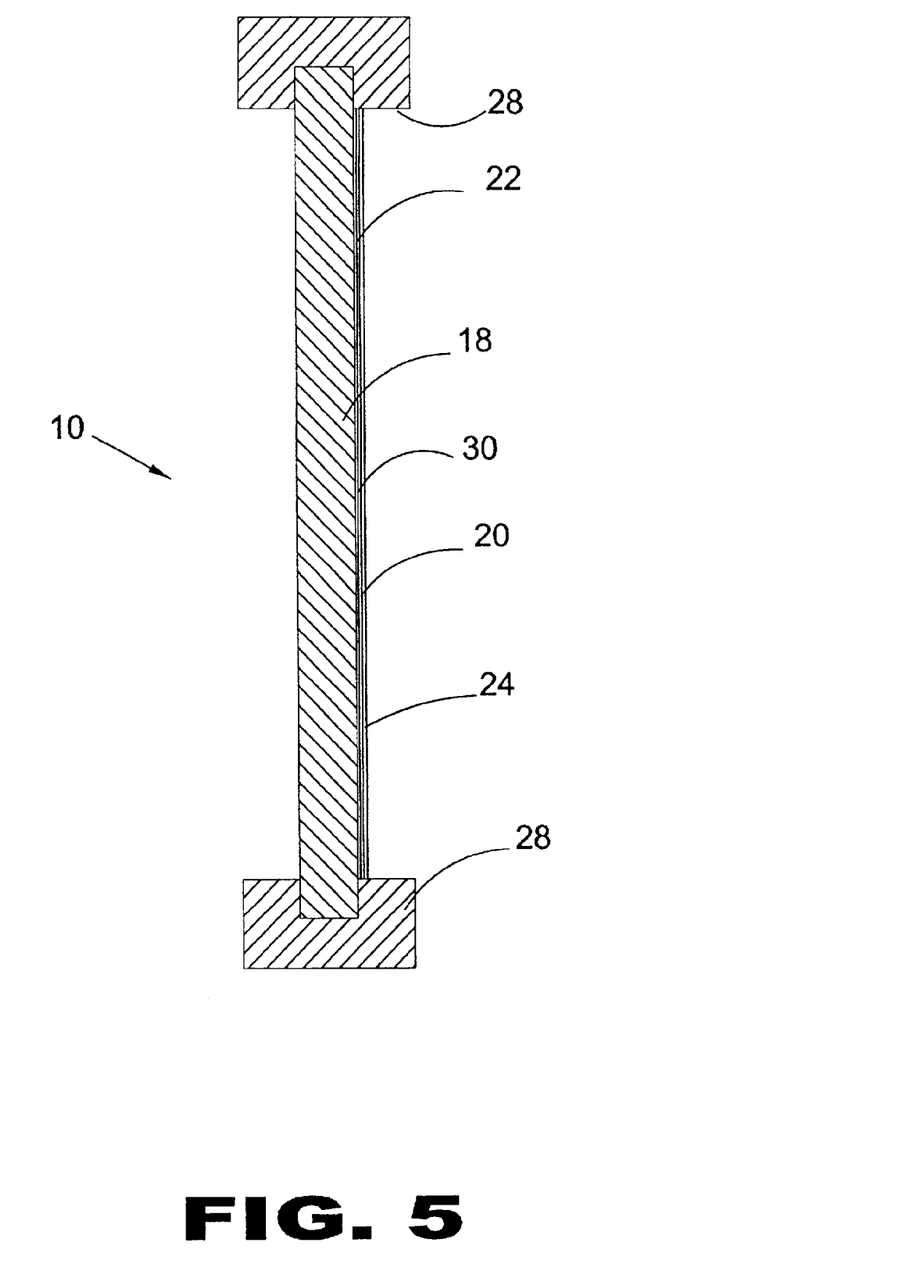
FIG. 5 is a cross section view of the present invention.

Turning to FIG. 5, shown therein is a cross section view of the present invention 10. Shown is the present invention with the polarized film selectively applied to a transparent medium 18 held in frame 28 to produce a user specified tint and hue property on the surface of the glass. The degree of polarization for the film can be produced having the plurality of polarization layers 20, 22, 24 conformed to one another in a manner producing a tint ranging from 5% to 55% by successively applying polarization layers to the previous layer to increases the amount of light filtered. The film hue and color may be changed by combining different colored layers that may blend together to form a selected hue. An adhesive 30 bonds the inner layer 20 to the transparent medium 18.

Figure 6:
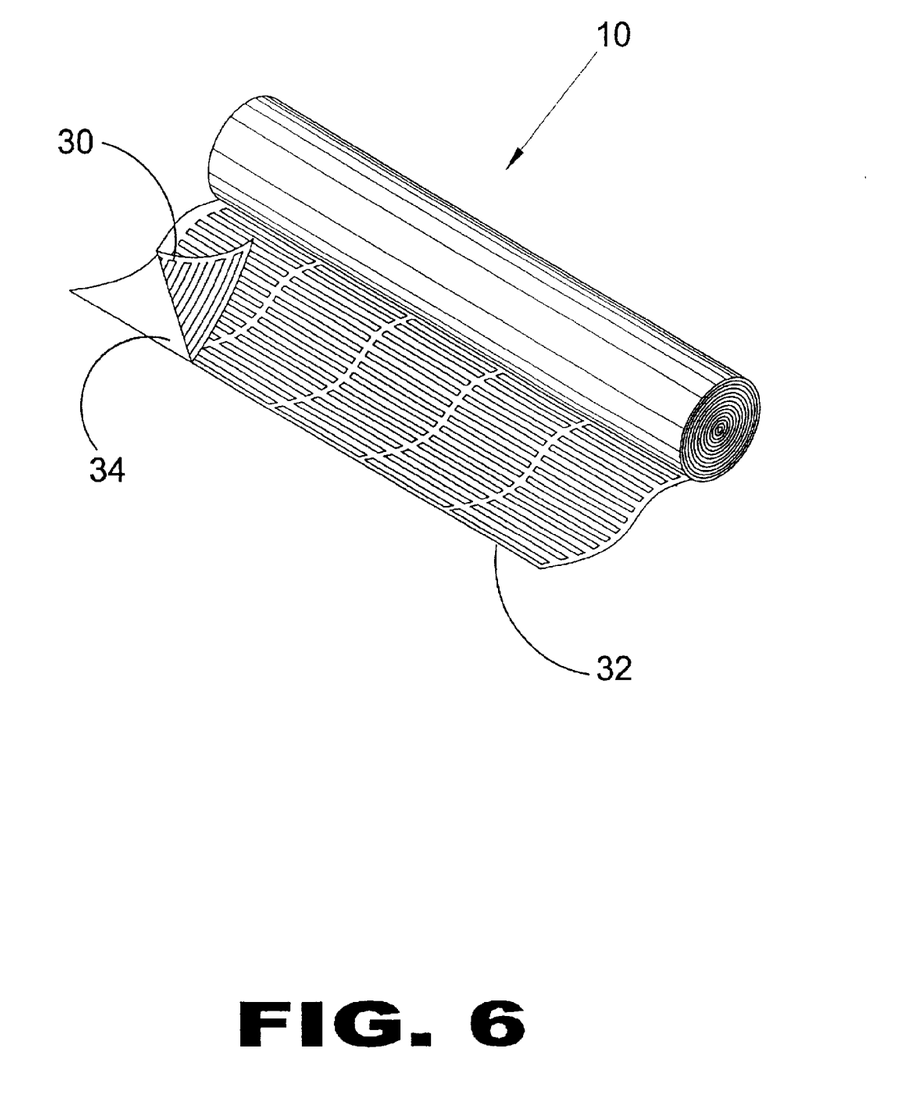
FIG. 6 is a perspective view of the present invention.

Turning to FIG. 6, shown therein is a perspective view of the present invention 10. Depicted is a roll of the polarizing film 32 having a protective backing 34 to protect the adhesive 30 on the back of the film 32 from exposure to air and other elements that may impair the chemical adhesion process until application, whereby the user may then remove the protective adhesive covering 34 and select an appropriate transparent medium for application of film 32 thereto.

Figure 7:
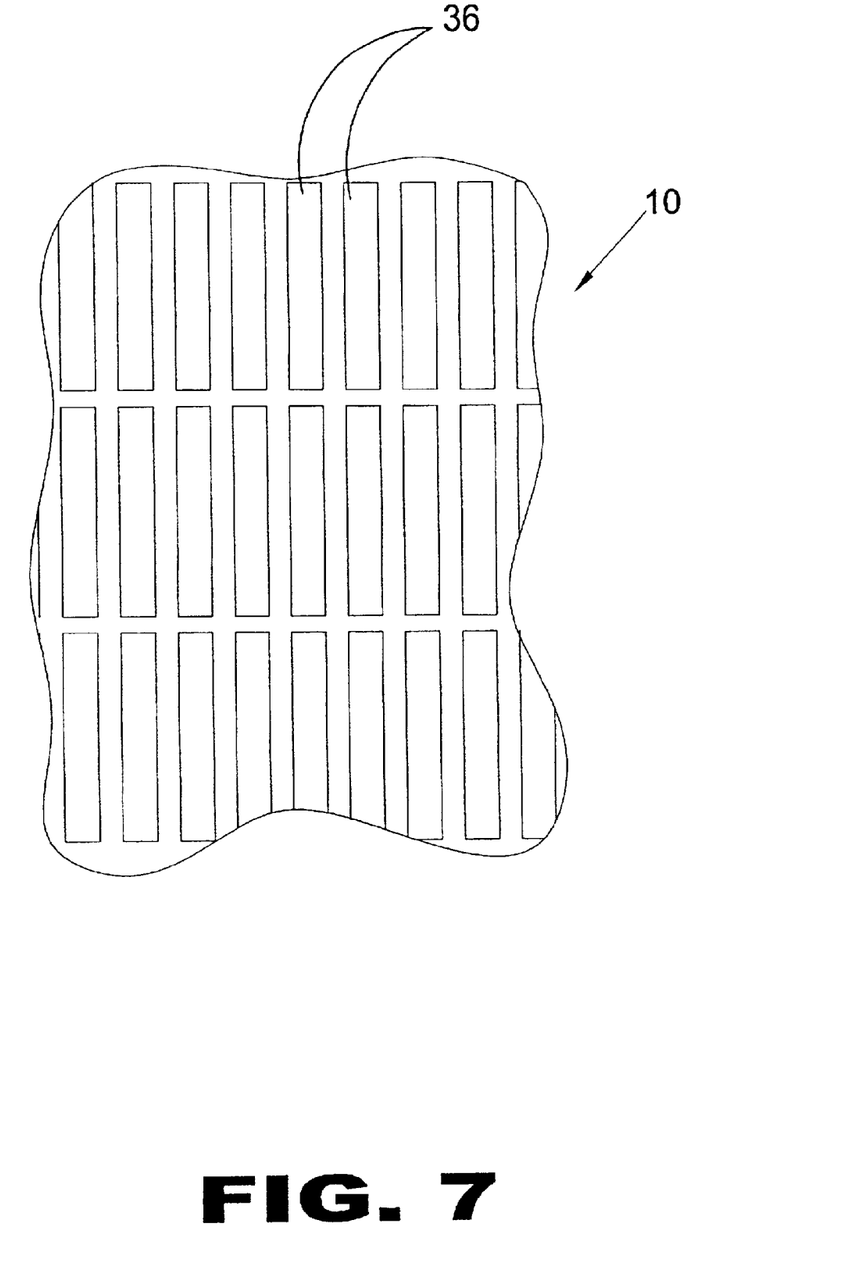
FIG. 7 is a front view of the present invention.

Turning to FIG. 7, shown therein is a front view of the present invention 10. Shown is a magnified view of a possible structural configuration of the vertical apertures 36 for one of the polarization layers comprising the polarizing film of the present invention. The size and shape of the vertical apertures 36 comprising the polarizing layer regulate the diffusion and reflection of light.

Figure 8:
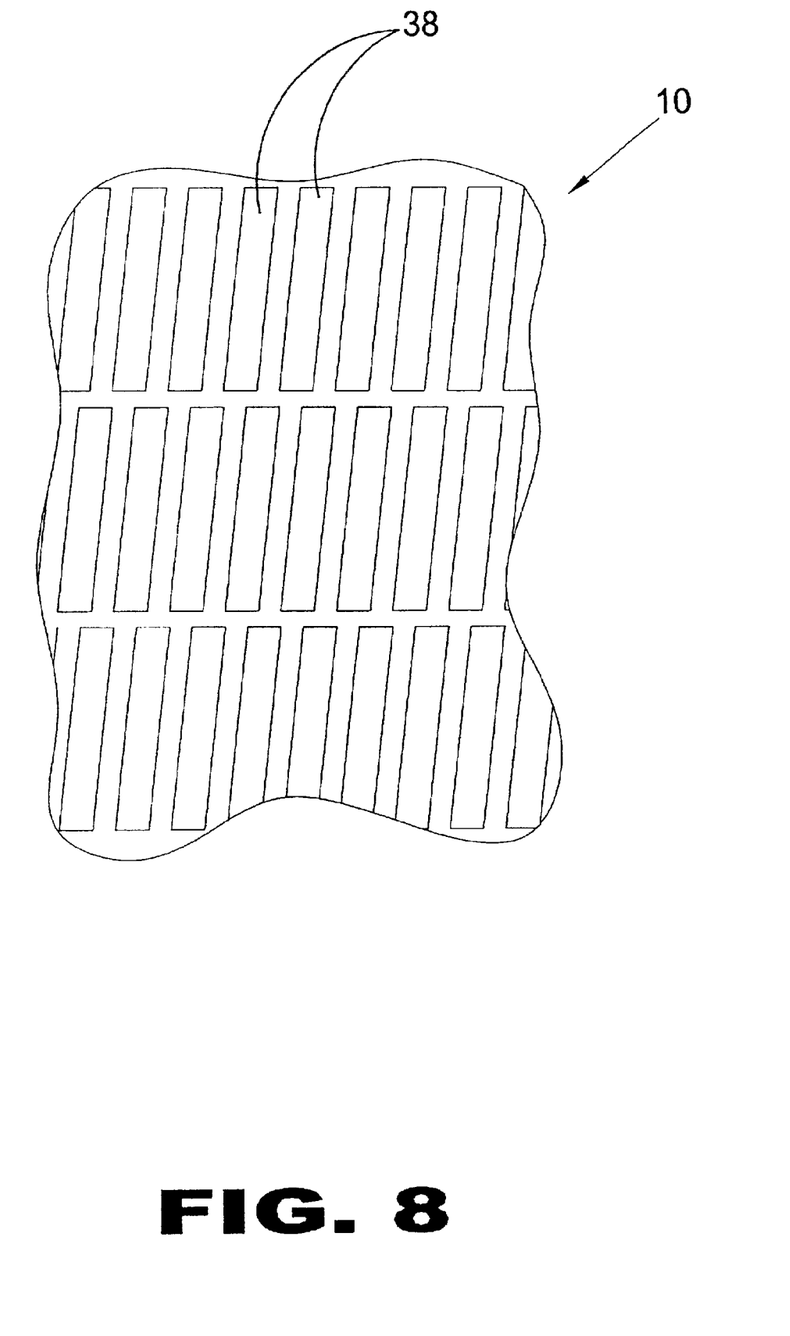
FIG. 8 is a front view of the present invention.

Turning to FIG. 8, shown therein is a front view of the present invention 10. Shown is a magnified view of a second possible configuration of angular apertures 38 comprising the polarization layers. The combination of the polarizing layers having progressively increasing or decreasing angular configurations of apertures 38 produces a tinting and polarizing effect when applied to a transparent medium surface by further reducing the allowance of light.

Figure 9:
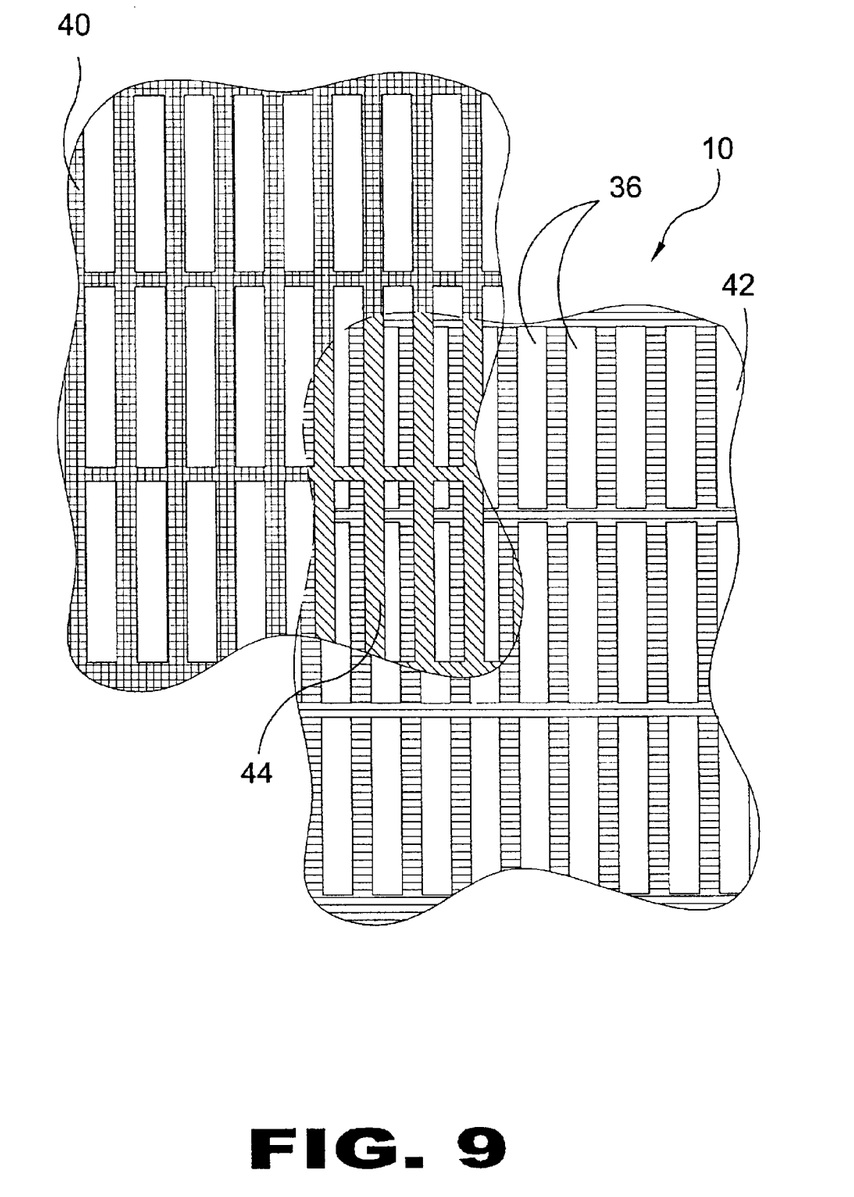
FIG. 9 is a front view of the present invention.

Turning to FIG. 9, shown therein is a front view of the present invention 10. Shown is a magnified view of vertical apertures 36 of two polarized filters having differing color hues 40, 42 combining to form a desired hue 44 allowing for many verities of hues and tints to be produced.

Figure 10:
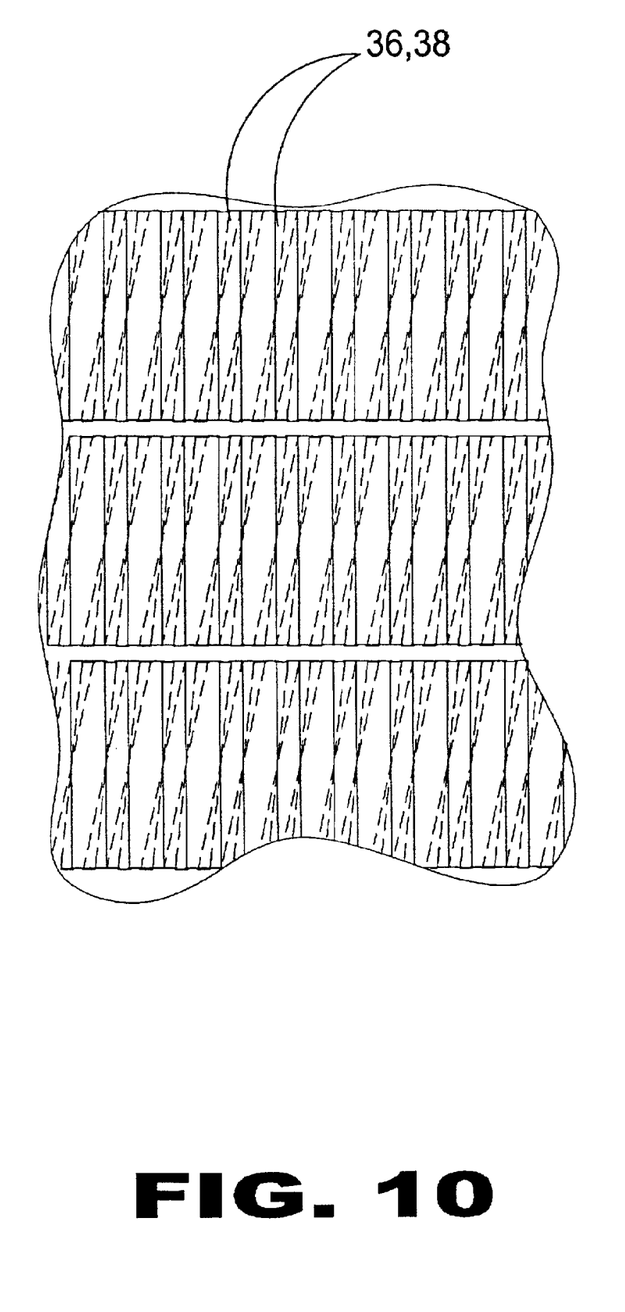
FIG. 10 is a front view of the present invention.

Turning to FIG. 10, shown therein is a front view of the present invention. Shown is a magnified view of a plurality of polarizing layers forming the polarizing film manufactured of a light absorbing or blocking material. The plurality of polarizing layers each increasingly block the amount of light passing through the filter by having biased or overlapping apertures 36, 38 when used in combination of both vertical 36 and angular 38 apertures. Thereby a plurality of polarized filter films can be tailored to the needs of the desired end result.

Figure 11:
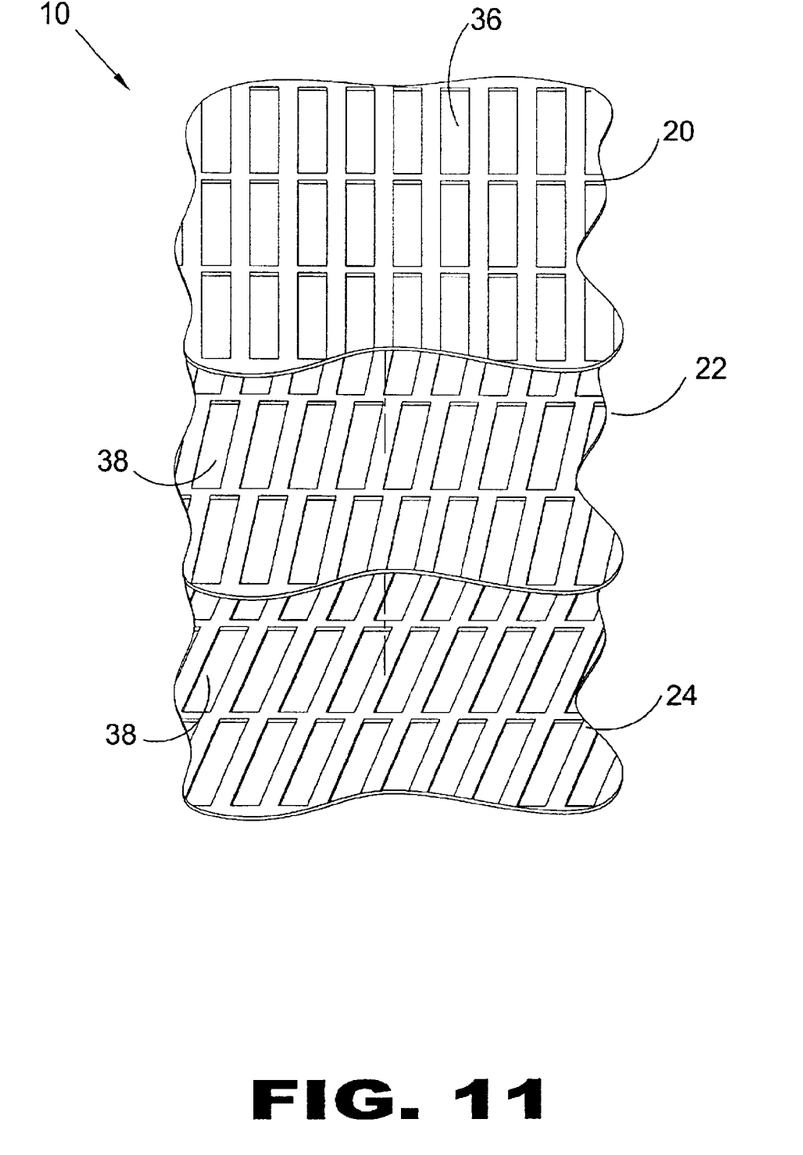
FIG. 11 is an exploded view of the present invention.

Turning to FIG. 11, shown therein is a front view of the present invention 10. Shown is the present invention with a plurality of polarizing layers being of varying angular degrees from the vertical to provide a polarizing effect to the light that passes through. The polarizing filters strength is variable during the production process to produce a polarization effect between 5% and 55%. Shown is a first layer 20 with vertical apertures 36, a second layer 22 with angular apertures 38, and a third layer 24 with different angular apertures 38.

I claim:

1. An apparatus for blocking light rays comprising a plurality of polarized films, each of said plurality of polarized films having polarization apertures, wherein each film has a top and bottom side, said plurality of polarized films are pliable and peelably connected to one another by a first adhesive layer positioned between said bottom side and said top side of adjacent polarized films, said plurality of polarized films are connected to a transparent medium by a second adhesive layer positioned between said bottom side of a respective one of said plurality of polarized films adjacent to said transparent medium, wherein polarization apertures have various predetermined sizes and angular orientation causing said plurality of polarized films to be polarized and each respective one of said plurality of polarized films has a unique tint level, wherein upon securing said plurality of polarized films to said transparent medium, a user can selectively determine an opacity level by selectively peeling off respective ones of said plurality of polarized films.

2. The apparatus of claim 1, wherein said plurality of polarized files have an opacity rating of from 5% to 55%.

3. The apparatus of claim 2, wherein said polarization apertures are formed as various geometric shapes.

4. The apparatus of claim 3, wherein said plurality of polarized films are formed as a roll.

5. The apparatus as recited in claim 4, wherein said transparent medium is a vehicle windshield.

6. The apparatus as recited in claim 4, wherein said transparent medium is a vehicle side window.

7. The apparatus as recited in claim 4, wherein said transparent medium is a patio door.

8. The apparatus of claim 1, wherein said plurality of polarized films have an opacity rating greater than 50% and less than 55%.

* * * * *